Figure 3:
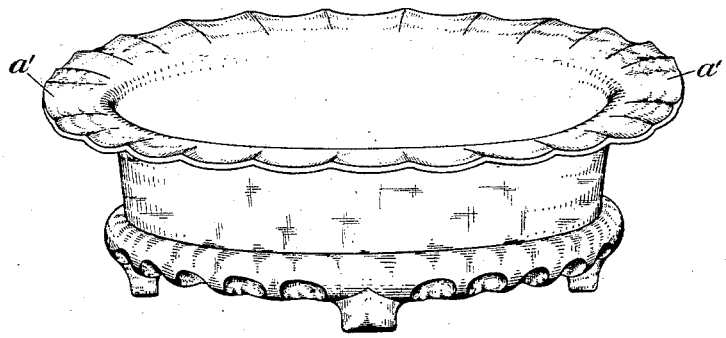

(No Model.)　　　　　　　　　　　　　4 Sheets—Sheet 1.
D. C. RIPLEY.
METHOD OF SHAPING GLASSWARE.
No. 336,666.　　　　　　　Patented Feb. 23, 1886.
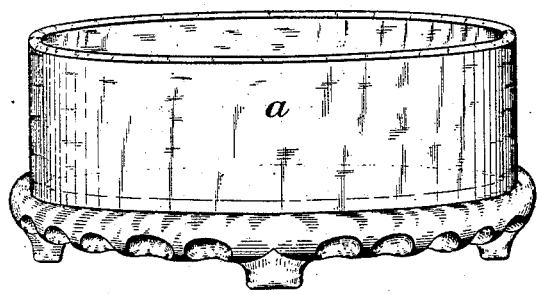
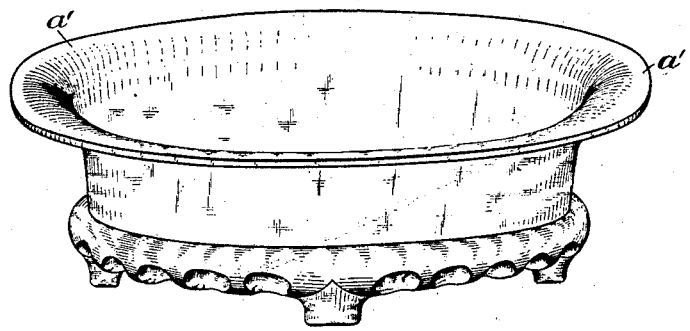
WITNESSES:　　　　　　　　　　INVENTOR,
Harry L. Gill　　　　　　　　　　Daniel C. Ripley
J. A. Burns.　　　　　　　BY　Bakewell & Kerr,
　　　　　　　　　　　　　　　　ATTORNEYS.

(No Model.) 4 Sheets—Sheet 2.

D. C. RIPLEY.

METHOD OF SHAPING GLASSWARE.

No. 336,666. Patented Feb. 23, 1886.

WITNESSES: INVENTOR,
Harry L. Gill Daniel C. Ripley
J. A. Burns BY Bakewell & Kerr
ATTORNEYS.

(No Model.) 4 Sheets—Sheet 3.
D. C. RIPLEY.
METHOD OF SHAPING GLASSWARE.
No. 336,666. Patented Feb. 23, 1886.
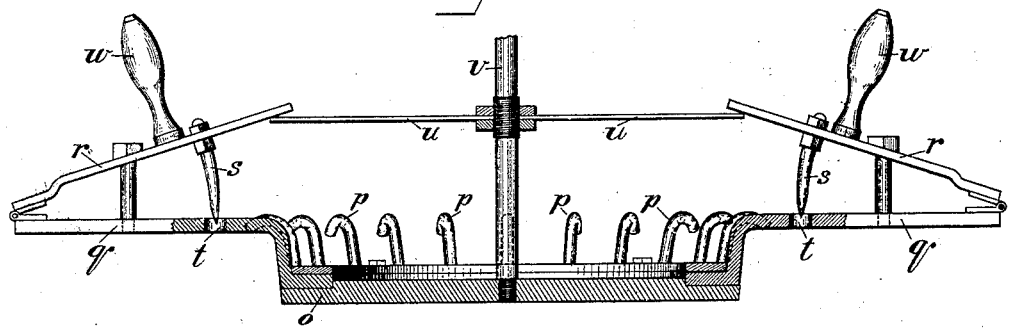
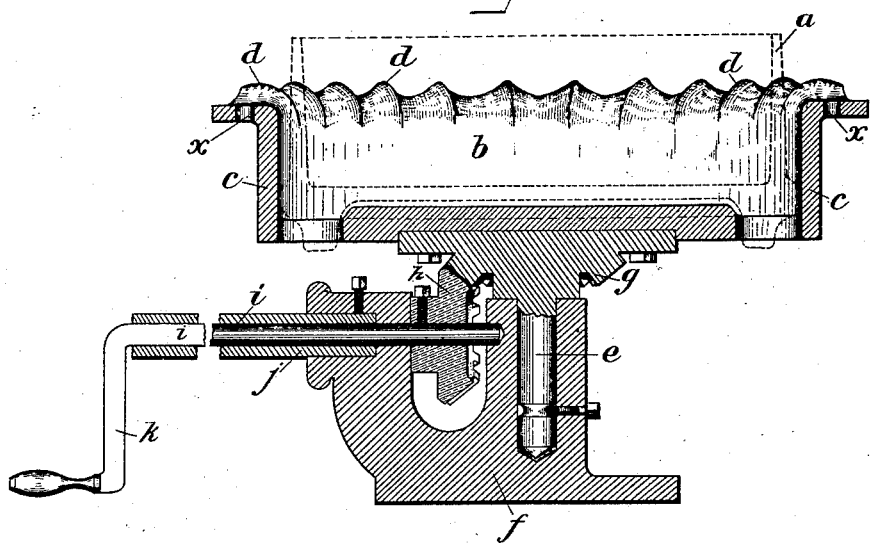
WITNESSES.
Harry L. Gill
J. A. Burns
INVENTOR
Daniel C. Ripley
BY Bakewell & Kerr
ATTORNEYS.

(No Model.) 4 Sheets—Sheet 4.
D. C. RIPLEY.
METHOD OF SHAPING GLASSWARE.
No. 336,666. Patented Feb. 23, 1886.
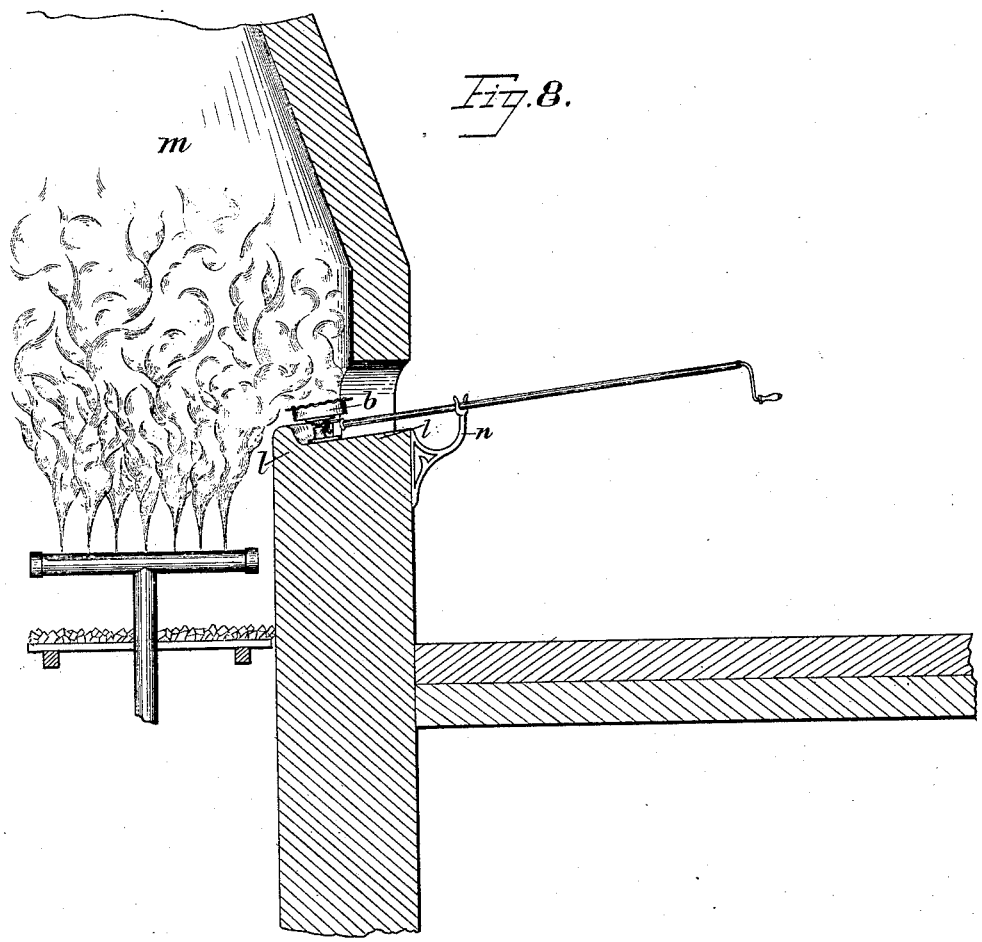
WITNESSES:
Harry L. Gill
J. A. Burns
INVENTOR,
Daniel C. Ripley
BY Bakewell & Kerr
ATTORNEYS.

UNITED STATES PATENT OFFICE.

DANIEL C. RIPLEY, OF PITTSBURG, PENNSYLVANIA.

METHOD OF SHAPING GLASSWARE.

SPECIFICATION forming part of Letters Patent No. 336,666, dated February 23, 1886.

Application filed November 23, 1885. Serial No. 183,631. (No model.)

*To all whom it may concern:*

Be it known that I, DANIEL C. RIPLEY, of Pittsburg, in the county of Allegheny and State of Pennsylvania, have invented a new and useful Improvement in Methods of Shaping Glassware; and I do hereby declare the following to be a full, clear, and exact description thereof.

My invention consists in an improved method of shaping articles of glassware by the combined effect of centrifugal action and gravity. The glass must be heated to a semi-plastic or softened condition in order to be acted upon in the desired manner by these forces.

In carrying my invention into practice, I first make a blank having the general characteristics of the desired article, or of such other shape as is capable of being brought to the ultimate form desired by being submitted to my improved process. This blank or preliminary article I prefer to make by pressing in a suitable mold, because thereby economy is preserved, and the desired size, weight, and shape are more accurately and uniformly obtained. Moreover, the article is finished and fire-polished by the second step, so that less care is necessary in the molding operation and in the construction and condition of the molds. In making a dish having a flared and fluted or crimped mouth, for instance, by my improved method, a blank with plain or straight vertical sides is first pressed. This blank is placed in a holder or chuck, having a ring or former, of less height than the sides of the article, encircling it; the upper surface of the former has the contour, angle, curve, or pattern which is to be imparted to the rim or edge of the article. The holder and article are then placed in the flame of a reheating or other furnace and rotated at a high speed. The unsupported edge of the article which projects above the former soon becomes softened by the heat, and is spread out laterally over the edge or top of the former by the centrifugal action. It maintains a horizontal position as long as the rotation is rapid, but when it has become sufficiently softened and extended the rotation of the holder is gradually checked or entirely stopped, and then it settles down on the former and takes its shape therefrom. This operation not only shapes the article, but gives it a fine finish and fire-polish, completely removing all mold marks and imparting the thin edges and brilliant finish of fine blown ware. It enables me to produce many articles of fine glassware which can now be made only by expensive hand manipulation, while the product, in some instances, is of beautiful and unique appearance unattainable by any method heretofore known to me.

To enable others skilled in the art to make use of my invention, I will now describe it by reference to the accompanying four sheets of drawings, in which it is illustrated as applied to the manufacture of a cake-basket having a flared and fluted top.

Figure 4:
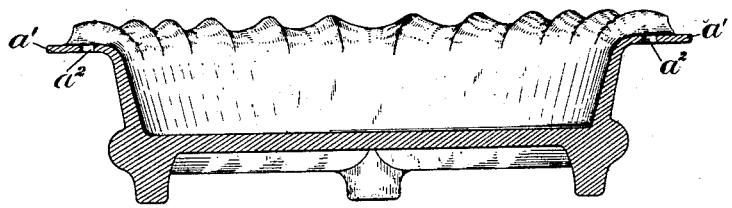
Figure 5:
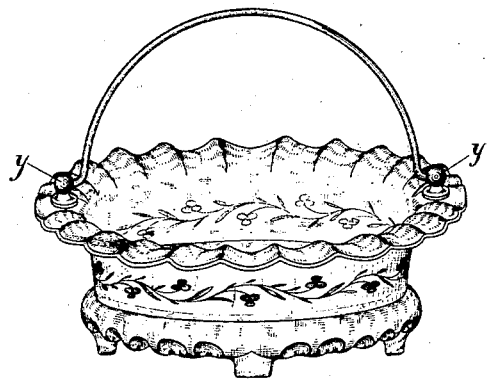

In the drawings, Figure 1 is a view of the preliminary blank. Fig. 2 is a view of the blank after being submitted to the spreading or flaring operation. Fig. 3 is a view of the blank after it has received the impression of the former. Fig. 4 is a sectional view of the blank after it has been subjected to the action of the crimper. Fig. 5 is a view of the finished cake-basket. Fig. 6 is a sectional view of the crimper before referred to. Fig. 7 is a sectional view of the holder or chuck. Fig. 8 is a view of a reheating or finishing furnace, and illustrates the operation.

Like letters of reference indicate like parts in each.

The blank $a$ is pressed in a mold in the usual way, and is of cup shape with straight plain vertical sides. After being removed from the mold, it is placed in a chuck or holder, $b$, Fig. 7, the construction of which is as follows: It has a shallow body, with low sides $c$ for receiving the article, and at the upper edge of the sides a ring or former, $d$, which may be formed integral with the sides $c$ or otherwise, as may be desired. The upper surface of the former $d$ has the desired curve, flare, angle, contour, or pattern which it is desired to impart to the mouth or rim of the finished article—in this instance, the same being a scallop, so as to flute the edge of the article. The chuck $b$ is mounted on a suitable shaft, $e$, which is stepped in a base-plate or bed, $f$, and the shaft is provided with a beveled gear-wheel, $g$. A pinion, $h$, mounted on the inner end of the shaft $i$ meshes into the gear-wheel $g$. The shaft $i$ is of any desired length, and is provided with a crank, $k$, or other suitable means for turning the same, so as to communicate the desired rotation to the chuck $b$ through the medium of the pinion $h$ and gear-wheel $g$. The shaft $i$ extends through a tube, $j$, so that the chuck may be moved and handled without stopping the rotation of the shaft.

When the blank $a$ is placed in the chuck $b$, it occupies the position shown by dotted lines in Fig. 7, with the upper end projecting above the sides $c$, so that in the subsequent spreading or flaring operation it is unsupported thereby. The article being placed in the chuck, as shown, the latter is placed on the bench $l$ of the furnace $m$, with the shaft resting on a bracket, $n$, or other suitable support, as shown in Fig. 8. The chuck $b$ is then rotated, slowly at first, but with increasing rapidity as the upwardly-projecting edge of the blank $a$ becomes softened by the heat, until the movement becomes rapid enough to cause the unsupported end of the blank to spread out in a horizontal or lateral direction, as shown in Fig. 2 at $a'$. So long as the rotation continues to be rapid enough, the glass being maintained at the proper temperature, this flared or expanded end will remain in a horizontal position. When, however, it becomes sufficiently spread, the rotation is gradually checked and the article drawn out of the furnace. This permits the flared edge to settle by its own gravity upon the former $d$, so that the shape of the upper surface of the former is imparted to the flared edge, as shown at $a'$ in Fig. 3.

The effect of the reheating upon the article is to remove all mold-marks, and to impart to its surface the fine finish and brilliancy which results from fire-polishing. The rapid rotation of the article reduces the thickness of its edge and gives it the shell-like appearance of finely-finished blown ware.

The presence of the former $d$ enables me to obtain absolute uniformity of product and the advantages of a thorough fire-polishing operation without distortion of the article. It takes away from the manufacture the expensive forming or shaping operations heretofore possible only by hand-labor at the chair and requiring the exercise of the highest degree of skill. This part of my invention is applicable to many purposes. It enables me to impart beautiful and unique forms to many articles of fine glassware, and obviates the necessity of "sticking up" in the manufacture of nappies and the subsequent cutting out of the marks of the "punty." It is applicable to the manufacture of glass shades and globes and all articles in which a preliminary blank of cup shape can be used. It is also applicable to the manufacture of glass disks, plates, &c., by forming a suitable blank and securing it on a holder of perfectly flat shape, and then rotating it at a high speed in the presence of high heat, so that the cup portion of the article shall be spread out by the centrifugal action and then be permitted to settle down and take its form from the smooth surface of such holder.

In the use of my invention it is necessary that the sides which are to be spread should be unsupported, and that a suitable forming-surface should be arranged underneath, so that the article should take its final shape by settling down on the same.

In the manufacture of the cake-dish by which I have illustrated my improvement, it is desirable to form holes in the flange $a'$, for the attachment of a handle or bail, and, in order to make the flutes on the surface of the flange more defined, I have combined the apparatus for making such holes with a crimping device. This construction is shown at Fig. 6, in which $O$ is a disk, having a series of crimping teeth or jaws, $p$, arranged around the edge of the same, which teeth correspond with the flutes of the former $d$. Attached to the disk $o$ on opposite sides are two bars, $q$, and hinged to the end of each bar is an arm, $r$. The arms $r$ carry punches $s$, which work through holes $t$ in the bars $q$. The arms $r$ are maintained in position by a spring, $u$, mounted on a center post, $v$, which rises from the disk $o$. The former $d$ has holes $x$, corresponding to the holes $t$, for the passage of the ends of the punches. When the crimper is placed in the article, the workman takes hold of the handles $w$ and presses downward, forcing the punches $s$ through the flange $a'$ and the holes $x$. The pressure also forces the teeth $p$ down on the flange $a'$ and increases the depth of the scallops or crimps in the flange. When the handles $w$ are released, the spring $u$ retracts the punches. The result is the formation of the holes $a^2$, Figs. 4 and 5, for the attachment of the bail-lugs $y$, Fig. 5.

I do not limit myself to the construction of the revoluble chuck, nor to the devices for operating the same, which I have shown and described, because they may be varied not only to suit the form of the article to be made, the construction of the furnace, and the circumstances of the use, but also to suit the whim of the maker. I propose in some cases to rotate the former by power and in others by hand. Instead of the crimping-blades other forms of devices may be used to apply pressure to the reheated article after it has settled down on the former to aid the forming effect of the same thereon, as will be clearly understood by the skilled maker of glassware.

What I claim as my invention, and desire to secure by Letters Patent, is—

1. The method of making glassware, which consists in first producing a cup-shaped blank and then flaring and forming the same by the effect of centrifugal action and gravity exerted successively thereon, substantially as and for the purposes described.

2. The method of making glassware, which consists in first producing a cup-shaped blank and then flaring and spreading the upper or open end by rotating the same at a high speed without external support while in a heated or semi-plastic condition, and finally shaping the flared end by permitting it to settle or drop by its own gravity on a forming-surface of the desired pattern, substantially as and for the purposes described.

3. The method of making glassware, which consists in first producing a cup-shaped blank, then flaring or spreading the upper or open end by rotating the same at a high speed while in a heated or semi-plastic condition, then shaping the flared end by permitting it to drop or settle by its own gravity on a forming-surface, and finally applying pressure thereto, substantially as and for the purposes described.

4. The combination, in a machine for shaping glassware by centrifugal action and gravity, of a revoluble holder or chuck for holding the article, with a former surrounding the chuck and extending laterally therefrom, for giving shape to the article as it settles down thereon in a plastic state by gravity, substantially as and for the purposes described.

In testimony whereof I have hereunto set my hand this 10th day of November, 1885.

DANIEL C. RIPLEY.

Witnesses:
W. B. CORWIN,
THOMAS B. KERR.